Oct. 3, 1933.     H. BENDER     1,929,050
LOCK JOINT
Filed Dec. 23, 1931     3 Sheets-Sheet 1

Inventor
Heinrich Bender
By James R. Bowen
Attorney

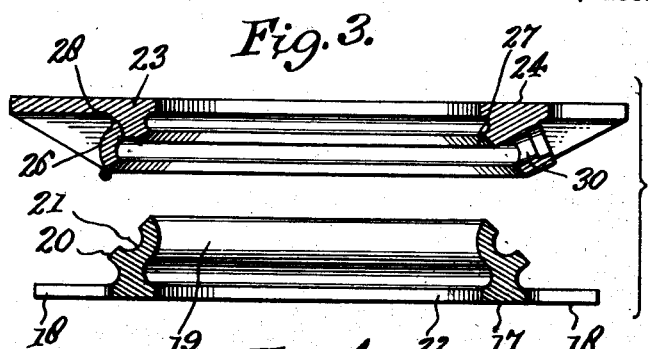
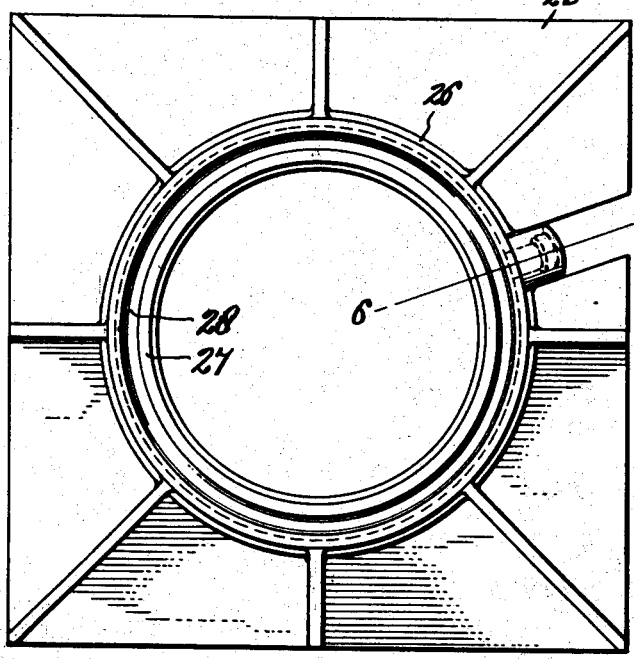
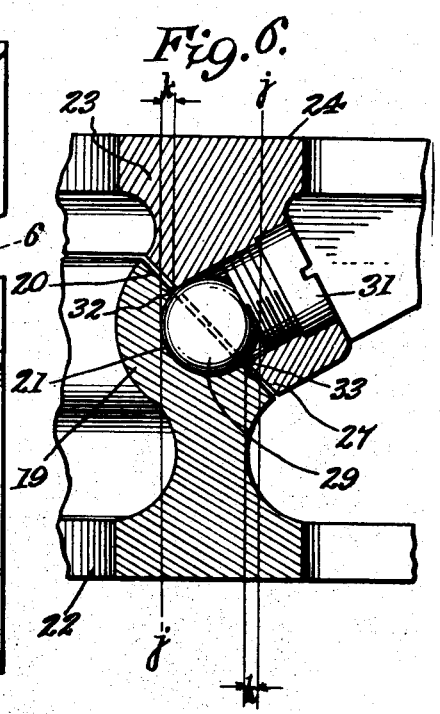
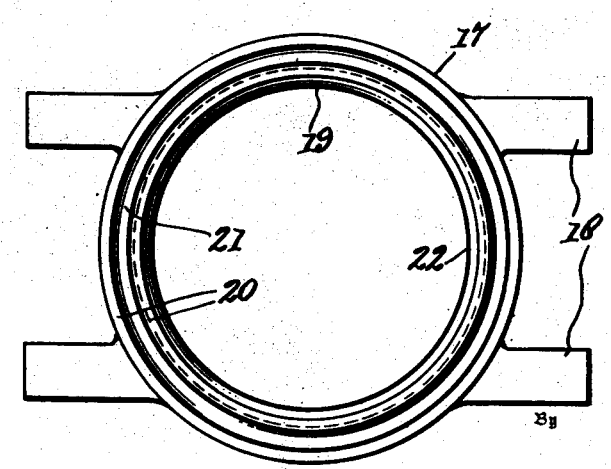

Oct. 3, 1933.  H. BENDER  1,929,050
LOCK JOINT
Filed Dec. 23, 1931   3 Sheets-Sheet 3
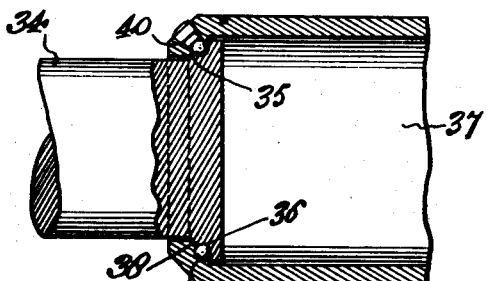
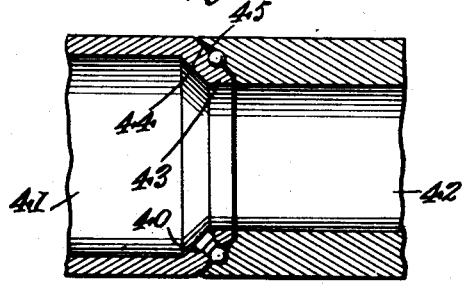
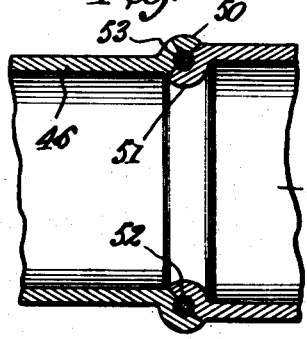
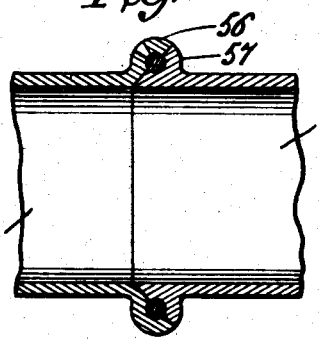
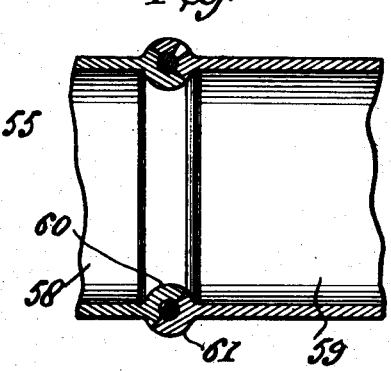
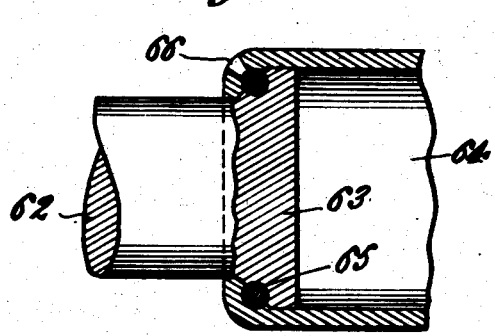
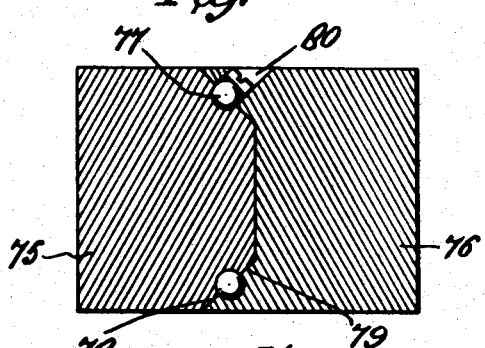
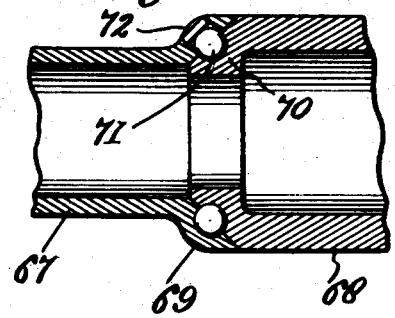
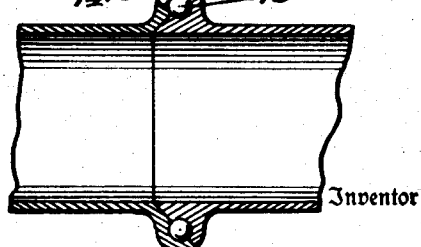
Inventor
Heinrich Bender
By James R. Bowen
Attorney Patented Oct. 3, 1933

1,929,050

UNITED STATES PATENT OFFICE 1,929,050

LOCK JOINT

Heinrich Bender, Stuttgart, Germany, assignor to Emil H. Hoffmann, Jersey City, N. J.

Application December 23, 1931, Serial No. 582,841, and in Germany April 24, 1931

1 Claim. (Cl. 287—91)

The present invention relates to improvements in lock joints, and has for an object to provide the utilization of a ball race preferably formed by the simultaneous combination of two prismatic surfaces set at an angle wherein grooves of semi-circular cross section are formed for receiving balls or fusible material.

Another object of the present invention is to provide a device of this character whereby the abutting prismatic surfaces can be securely held in alignment while at the same time allowing the parts to rotate with respect to one another, if desired.

A further object of this invention aims to present a simple and practical means that can be readily applied for locking two independent parts, such as the frames of a vehicle, bearing rings, shafts, crane-hooks, flat discs, pipes and the like, without the use of bolts or other similar fastening means.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a central vertical section through a rotary frame bearing for a vehicle wherein my improved lock joint is used to hold the frames.

Figure 3 is a vertical section through the parts of the rotary frame bearing as removed from the vehicle.

Figure 4 is a bottom plan view of the upper member of the rotary frame.

Figure 5 is a top plan view of the lower member of the rotary frame.

Figure 6 is an enlarged section taken on the line 6—6 of Figure 4.

Figures 7 to 15 inclusive are fragmentary cross sections through adjoining members showing the application of the improved joint in various relations.

Figure 1:
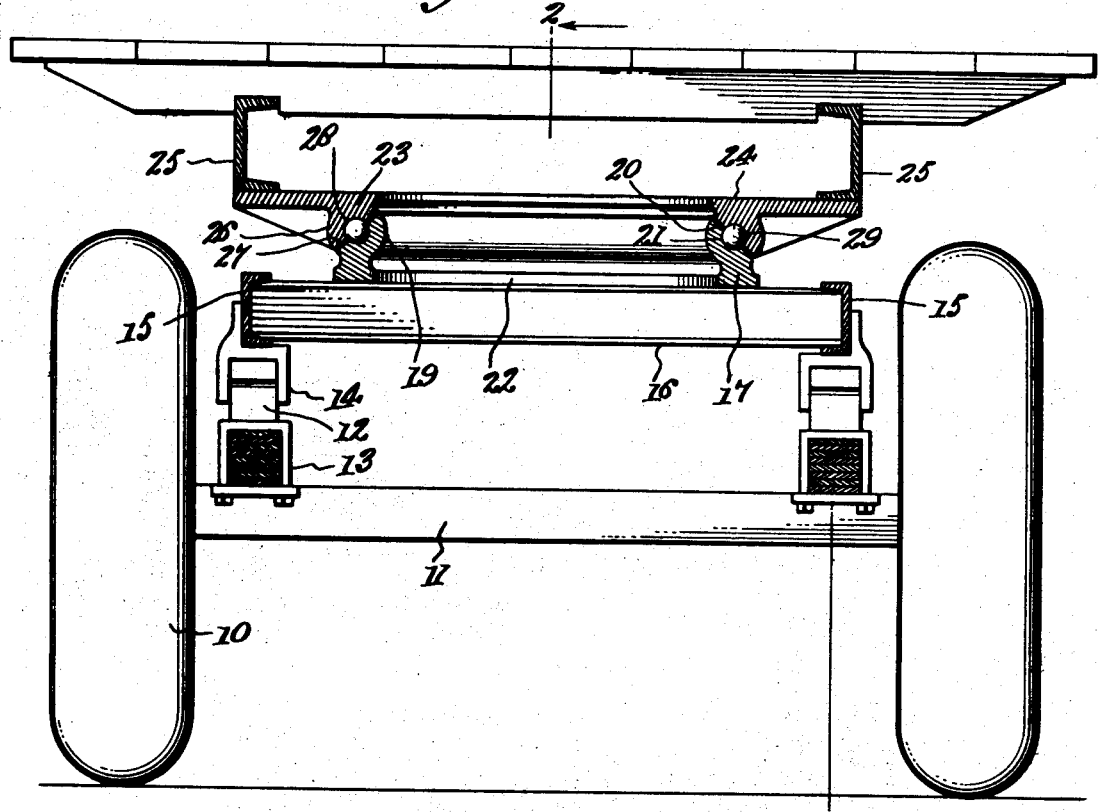
Figure 2:
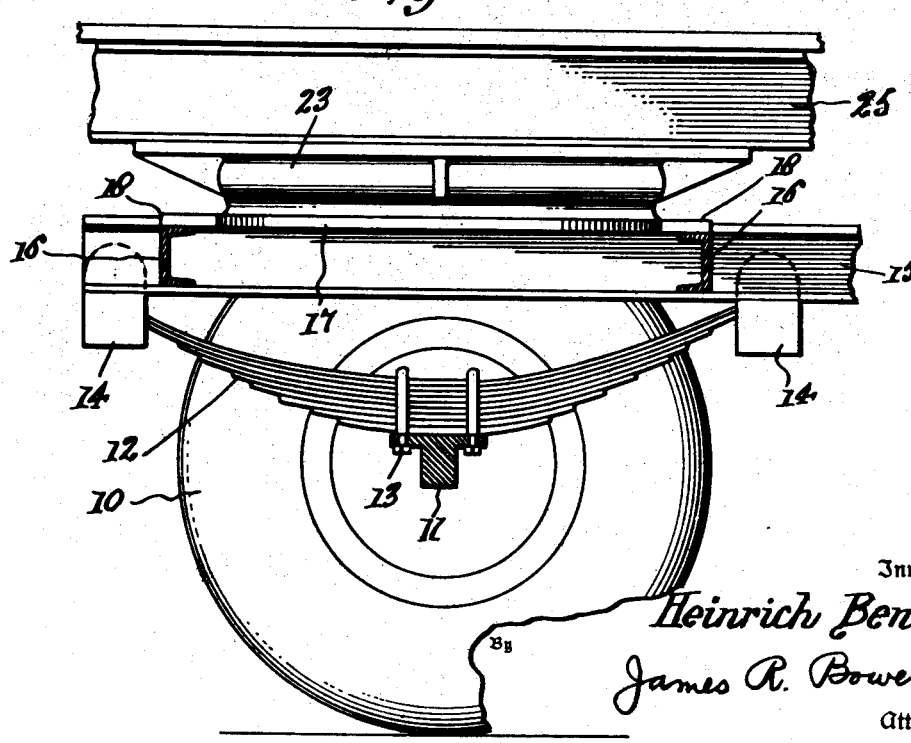
Figure 2 is a section along the line 2—2 of Figure 1 with the rotary frame bearing in elevation.

Referring more particularly to the drawings and more especially to Figures 1 to 6, I have shown my improved lock joint as adapted for use with vehicles in which 10 represents the front wheels carried by the axle 11.

The springs 12 are preferably mounted over the axle and bolted thereto at 13 with the outer ends of the springs carried by yokes 14 rigidly held by the longitudinally extending channel irons 15 forming the lower frame of the vehicle. These channel irons are provided with suitable cross brace supports shown at 16.

The lower member 17 of the rotary frame bearing presents a flat bottom surface with forwardly and rearwardly projecting lugs 18 which are supported and secured to the cross brace supports 16. This lower member 17 is preferably cast or formed with the upwardly projecting ring 19 cut away circumferentially at an angle of 45° to present the prismatic surface 20 in which is formed the groove 21, semi-circular in cross section and having its central axis at right angles to the prismatic surface 20. The inner portion of the lower member 17 is cut away as shown at 22 for the purpose of reducing the weight of this member.

The upper member 23 of the rotary frame member is likewise cast or formed with the flat top surface 24 rigidly secured to the upper longitudinally extending channel irons 25 forming a part of the upper frame of the vehicle. This upper member 23 has a downwardly projecting ring 26 cut away at an angle of 45° to form the prismatic surface 27 in which is formed a groove 28 also semi-circular in cross section with its central axis at right angles to the prismatic surface 27. These grooves 21 and 28 with their prismatic surfaces 20 and 27 are similar in all respects although placed in opposed relation so that when the same are brought into alignment a common angular groove is completed circular in cross section. The desired number of steel balls 29 are readily inserted through the opening 30 formed in the upper member 23 leading into the common circular groove, and are held from dropping out of the same by the screw plug 31 or by other suitable means as shown in Figure 6.

The circular ball race thus formed and filled about its entire circumference with balls brings about the desired union of the upper member 23 and the lower member 17 whereby these parts are held in alignment, and at the same time these parts are allowed to rotate with respect to one another. It will be readily seen that in obtaining this result the upper edge 32 of the lower groove 21 and the lower edge 33 of the upper groove 28 find resistance against separation of their respective members through the balls 29. The amount of resistance acquired is equivalent to the total of the inner and outer horizontal distance designated at "$k$", shown in Figure 3.

This distance "$k$" if measured is the distance between a vertical tangent to the balls 29 as shown at "$j$" and a vertical line passed through the upper edge 32 and the lower edge 33 of the grooves. The semi-circular grooves provided at an angle of 45° to the horizontal therefore set up the proper resisting surface through the balls to guarantee a proper union of the parts. Furthermore the prismatic form of the surfaces provides a ready means of self centering the upper and lower members, and also allow for the free rotary movement of these parts with respect to one another.

In Figure 7 I have shown a solid shaft 34 with its end enlarged and cut at an angle of 45° on its inner face to provide the prismatic surface 35 in which the semi-circular groove 36 is formed. The hollow shaft 37 is large enough to receive the enlarged end of 34, and has its inner end flanged and cut at a similar angle to form the prismatic surface 38 in which the semi-circular groove 39 is cut. When the ends of the two shafts are brought into alignment so that the prismatic surfaces register the same can be held together by the insertion of balls through the opening 40 in the hollow shaft 37. This application of the device will be advantageous where similar bearings are to be used for two shafts and rotary motions in the same or opposite directions desired simultaneously.

The device as shown in Figure 8 is applied to the hollow shafts 41 and 42 of the same external diameter. In this application of the device the shaft 41 is preferably made of thinner metal with its inner end 43 bent or flanged inwardly at an angle of 45° to form the prismatic surface 44 in which the semi-circular groove is cut. The shaft 42 is constructed of a thicker metal with its adjacent end cut at an angle with the semi-circular groove to provide the prismatic surface 45, corresponding with 44. Thus when the ends of the shafts with the prismatic faces are allowed to abut and balls are inserted through the usual opening shown at 40 the parts are held in the proper position for operating.

Referring more particularly to Figure 9, 46 and 47 represent two adjoining pipe sections having outwardly and inwardly flared ends 50 and 51, the meeting edges of which are on an angle of substantially 45° with respect to the axes of the pipe sections.

Within these flared end portions and leading from the prismatic abutting faces are the semi-circular grooves, which when fitted together form an annular groove circular in cross section extending all about the pipes. Into this groove is poured or otherwise inserted fusible metal or other material, which material is indicated at 52 and takes the form of the groove, completely filling the same, locking the pipes together and sealing the joint.

The opening through which the fusible material is introduced is indicated at 53. In this case the end portion 51 of the pipe 47 extends into the inner channel-way of the pipe and the pipe 46 is smaller in diameter than its companion 47.

In Figure 10 the pipe sections 54 and 55 are of uniform diameter and the abutting end parts 56 and 57 are wholly exterior of the pipe sections. Otherwise the construction is substantially as indicated in Figure 9. The channel-way through the pipes is uniform through all of the sections.

In Figure 11 the pipe sections 58 and 59 are also of a uniform diameter but the end portions 60 and 61 project respectively within and without the circumference of the pipe.

Referring more particularly to Figure 12, a construction very similar to Figure 7 is indicated including a solid shaft 62 having an enlarged head piece 63 lying within the larger hollow member 64. Between the two members are provided the prismatic surfaces and the annular groove into which fusible material 65 is poured through one or more openings 66.

Referring to Figure 13, two hollow members or pipe sections are represented at 67 and 68 of variable thickness and diameter. The member 67 is formed with an out-turned end portion 67; while the companion member 68 is formed with an inturned flange or head 70 of heavier construction. The meeting edges of the parts 69 and 70 are cut along the angle, preferably 45° and balls or fusible material indicated at 71 are placed in the grooves from the outside through the filling connection 72.

In Figure 14, a construction similar to Figure 10 is shown except that balls 73 are placed in the annular groove instead of fusible material and a filling neck and plug 74 accessible from the outside are furnished instead of the filling opening for fusible material.

In Figure 15, two solid blocks 75 and 76 are shown adapted to be locked together by the ball 77 lying within the annular groove provided in the blocks along the inclined faces 78 and 79 thereof. The groove is accessible from the outside through the filling neck 80.

It is obvious that various changes and modifications may be made in the details of construction and design of the above specifically described embodiment of this invention without departing from the spirit thereof.

What is claimed is:—

In a device of the character described, a pair of one piece members to be united together having conical meeting surfaces at an angle of substantially 45° to the axis of the members with mating depressions semi-circular in cross section therein adapted when united to present a continuous annular groove circular in cross section, said conical surfaces adjacent said depressions providing shoulders diagonally disposed relative to the axis of the members projecting outwardly from the semi-circular depressions, one of said members having a leadway to communicate with the annular groove, balls introduced through said leadway to fill the annular groove whereby the members are held together, and rotation of one member relative to the other member is permissible, and removable means for closing the leadway.

HEINRICH BENDER.